United States Patent [19]

Linder

[11] Patent Number: 5,007,305
[45] Date of Patent: Apr. 16, 1991

[54] RING BALANCER

[75] Inventor: Rene Linder, Genestrenio, Switzerland

[73] Assignee: Schmitt Industries, Inc., Portland, Oreg.

[21] Appl. No.: 570,320

[22] Filed: Aug. 20, 1990

Related U.S. Application Data

[62] Division of Ser. No. 201,482, Jun. 1, 1988, Pat. No. 4,951,526.

[51] Int. Cl.$^5$ ............................................. F16F 15/22
[52] U.S. Cl. .................................... 74/573 R; 73/470; 51/169
[58] Field of Search ...................... 74/573 R; 464/180; 73/458, 468, 470; 51/169

[56] References Cited

U.S. PATENT DOCUMENTS 4,867,006  9/1989  Giberson ........................... 74/573 R Primary Examiner—Gary L. Smith
Assistant Examiner—F. Saether
Attorney, Agent, or Firm—Seed and Berry

[57] ABSTRACT

A dynamic ring balancer for a machine shaft, including an annular case fixedly attachable to the shaft with a central aperture sized to receive the shaft therethrough. The case has an annular chamber extending about the case aperture and containing a pair of eccentrically weighted balancing rings rotatably mounted within the annular chamber. The rings are rotatable relative to each other and the case. A pair of turbine wheels are mounted at an outer wall of the case and are each selectively rotatable in both rotational directions in response to engagement by pressurized air flows. The air flow for each wheel are selectively applied by a stationary manifold as the wheels pass by the manifold while revolving with the case. A pair of reduction gear assemblies are mounted within the case and each drivably interconnects one of the wheels and the corresponding ring to convert rotation of the wheel into rotation of the ring. Through selective rotation of the wheels, the rings are progressively and independently rotated until the shaft is dynamically balanced. Thereafter, the reduction gear assemblies hold the rings locked in position until further adjustment of the rings is desired. In an alternative embodiment friction engagement wheels are used.

12 Claims, 6 Drawing Sheets

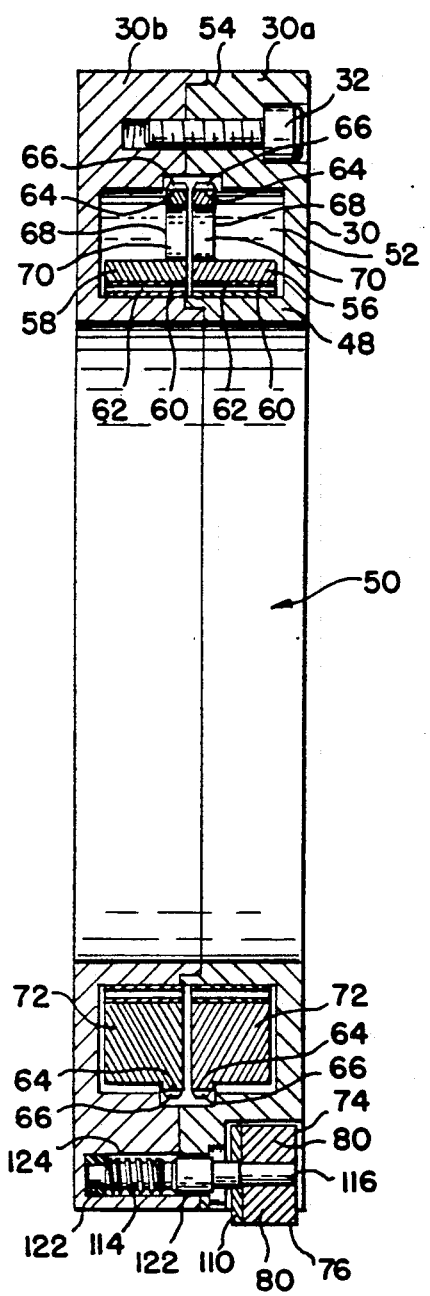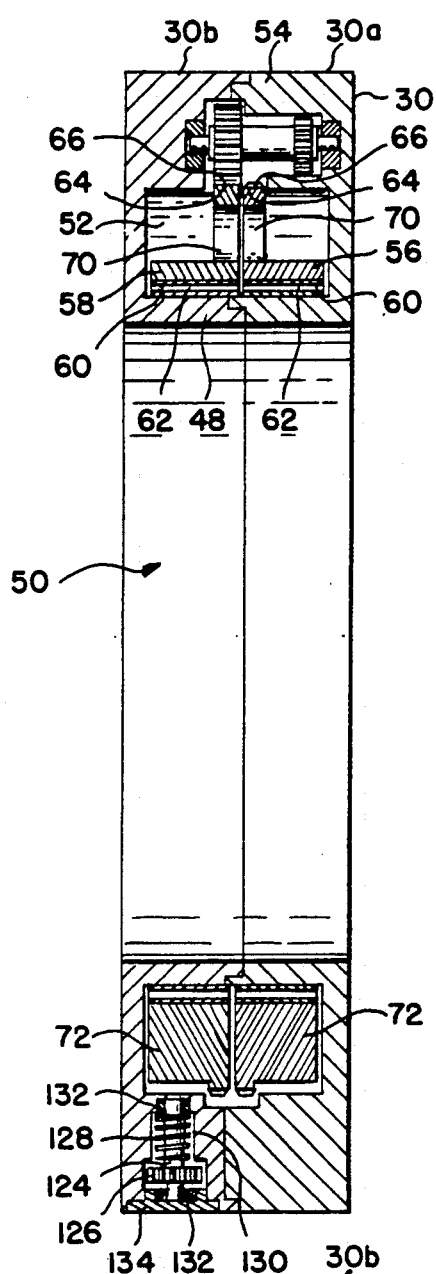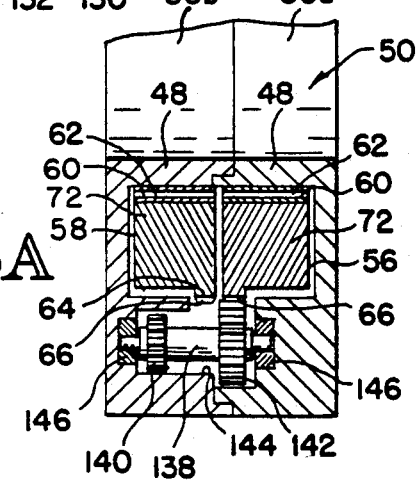

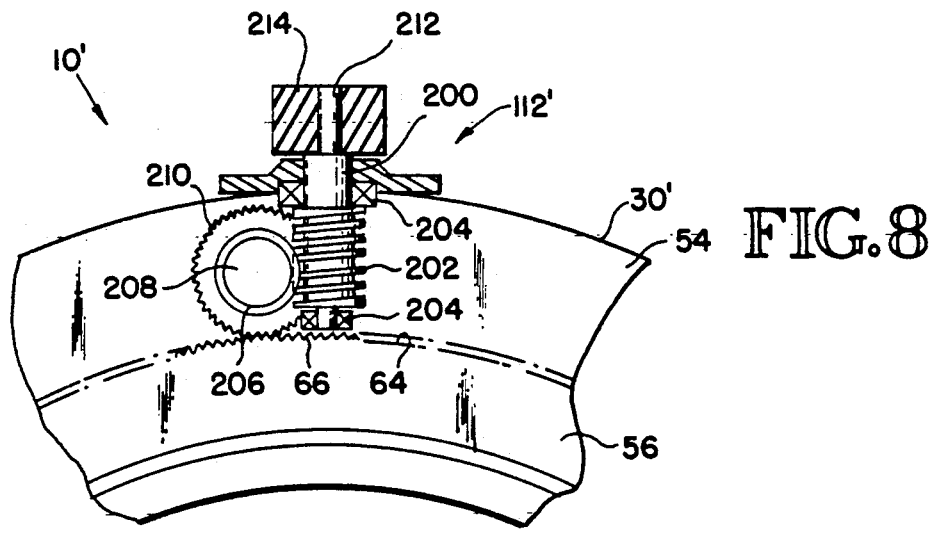
FIG. 8
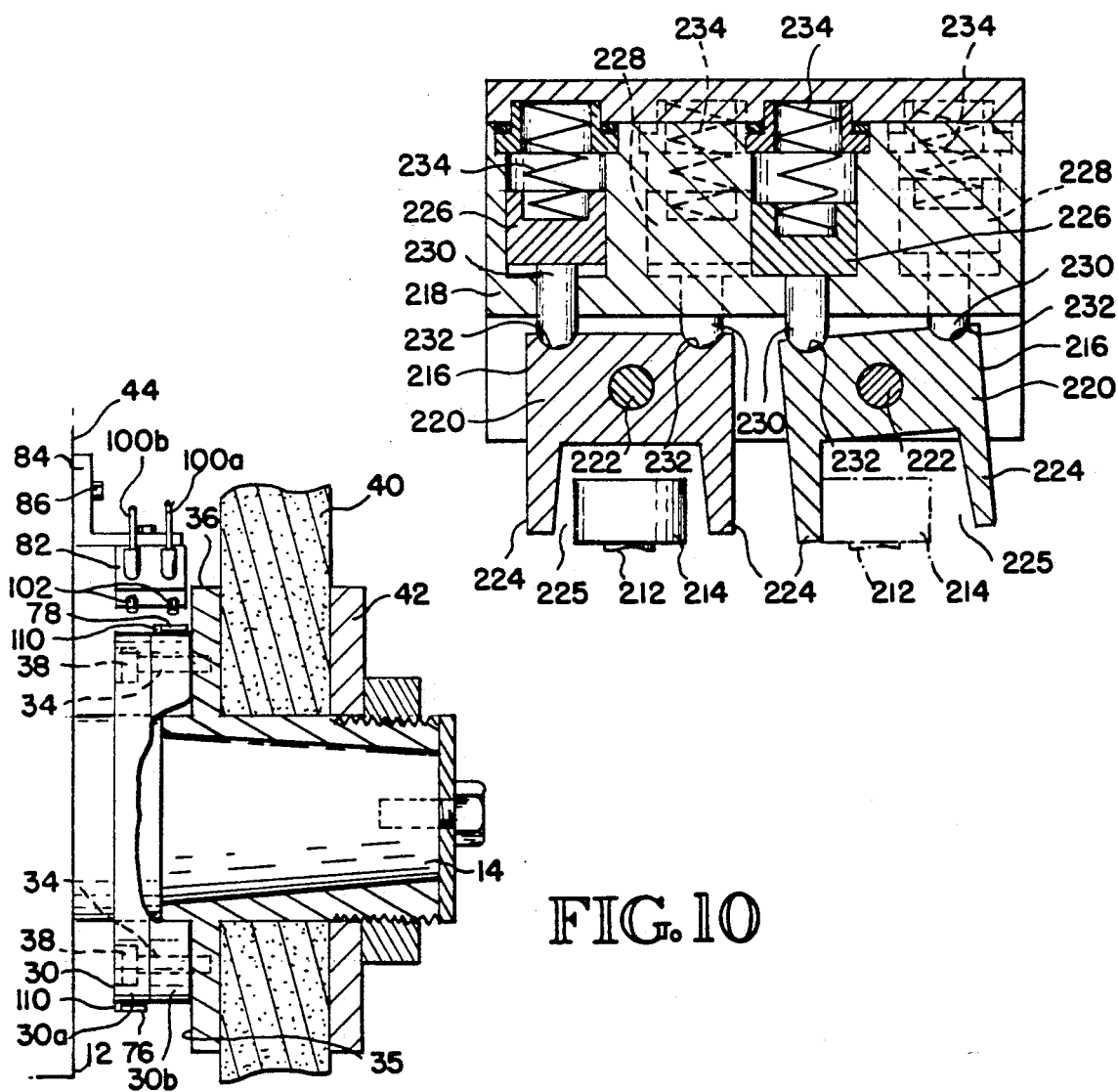
FIG. 9
FIG. 10

RING BALANCER

This application is a division of U.S. patent application Ser. No. 07/201,482, filed Jun. 1, 1988 now U.S. Pat. No. 4,951,526.

TECHNICAL FIELD

The present invention relates generally to balancers and, more particularly, to balancers for dynamically balancing a machine having a power driven rotatable shaft to eliminate vibration.

BACKGROUND OF THE INVENTION

In machines having a rotatable shaft, it is often desirable or mandatory to eliminate vibration in the shaft caused by shaft imbalances or imbalances in the load being rotated by the shaft. Shaft vibration is a particular problem with precision grinders, saws, lathes and other manufacturing equipment, as well as many other rotating devices, such as turbines and ventilation fans.

In the past, it has sometimes been possible to dynamically balance a shaft to eliminate vibration by fixedly attaching to the end face of a shaft free end protruding from the machine being balanced a device containing a pair of rotatable balancing masses carried in a case. The case also contains a pair of electric motors, with each motor being used to independently rotate one of the balancing masses within the case. The balancing masses are rotated to a position at which the combination compensates for the shaft imbalance and shaft vibration is eliminated. Such a device usually operates in conjunction with a vibration sensor or transducer which senses/measures the vibration of the machine and an electronic controller which analyzes the sensor information and provides electrical command signals to the motors within the case. These signals cause the motors to rotate the balancing masses into the desired position to eliminate imbalance.

As noted above, since the case is fixedly attached to the shaft, and the shaft is rotating at the rotational speed of the machine which, by way of example, can be several hundred to several thousand revolutions per minute, collector rings and slide contacts must be used to make electrical connections between the stationary wires that conduct these command signals from the controller and the rotating case containing the motors. Not only does this present the problem of maintaining good electrical contacts between stationary and moving components, but the problem is made even more difficult because of the environment in which such prior art balancers are frequently used. In particular, when used on grinding wheels, lathes and saws there is frequently machine oil or water being sprayed about as a lubricant and forming a mist which can contaminate or corrode the electrical contacts unless adequate seals are used between the stationary component and the rotating case. Of course, should the seals leak, electrical contact can be degraded or lost. With grinders, lathes and saws, there is also frequently dust or cuttings produced by the manufacturing process being performed. Even in devices such as turbines and ventilation fans, ordinary dust and other particulate contamination can create contact problems.

Another problem with prior art balancers relates to the large weight of the balancing masses required to balance most shafts. Since the balancer case is located at the end face of the shaft free end, it is positioned an appreciable distance from the load being carried by the shaft and the point where imbalance is likely to occur. Because of this distance, larger balancing masses are required than would be the situation if the balancing masses were placed immediately adjacent to the load or even within the shaft itself radially inward of the load. Placement of the balancer within the shaft can be accomplished with relatively large diameter machine shafts by mounting the balancer within a counterbore in the shaft. This is, of course, only possible with shafts having a sufficiently large diameter that such a counterbore can be formed without significantly reducing the strength and integrity of the shaft. Even with machines having a sufficiently large diameter shaft but without the necessary counterbore being formed therein at the time of manufacture, such internally mounted balancers are generally not desirable. Because of the expense and difficulty of machining a counterbore in an existing shaft, the fact that doing so could interfere with the operation of the machine, and the potential problems such could cause, internally mounted balancers are not used to retrofit existing machines. As such, the need continues for an externally mounted balancer.

As noted above, the relatively large weight of the balancing masses, when added to the weight of the case, electric motors and other components of the balancer, and when mounted at the shaft free end sometimes itself creates an imbalance. The weight creates an axial moment in the shaft, which is a particular problem with high precision grinders being used for side cuts. The axial moment can result in lateral wobble in the grinding wheel which reduces the precision of the side cut and produces swirl shaped marks in the surface being ground.

Another problem with prior art balancers which are mounted at the shaft free end, particularly with grinders, is that the balancer must be removed from the shaft each time the grinding wheel is changed, since the grinding wheel must be pulled off from the free end and a new replacement grinding wheel put on from the free end. This significantly increases the time and expense involved in changing a grinding wheel because of the extra time involved to remove and replace the balancer, and because of the balancer calibration and other start-up problems which are frequently encountered.

In addition to the other problems discussed, prior art balancers utilizing electric motors tended to have higher than desired maintenance and repair problems, and the manufacturing cost is higher than desired because of the motors. It has also been discovered that the centrifugal force to which the electric motors are subjected during high speed operation within the case as it rotates affects the output rotational speed of the motors, thus causing inaccuracies in the balancing process. Since electric motors are utilized, cables used to conduct the command signals, get in the way and are themselves subject to damage.

It will therefore be appreciated that there has been a significant need for externally mounted dynamic balancers which overcome the aforementioned deficiencies in prior art balancers. The present invention fulfills this need and further provides other related advantages.

DISCLOSURE OF THE INVENTION

The present invention resides in a balancer for dynamically balancing a machine having an elongated rotatable element power driven in at least a first rotational direction about a longitudinal rotational axis. In one embodiment, the balancer includes an annular case with a central aperture sized to receive the rotatable element therethrough. The case has an interior annular chamber extending about the central case aperture in substantially coaxial alignment with the rotatable element. The balancer further includes means for fixedly attaching the case to the rotatable element for rotational travel therewith.

First and second eccentrically weighted balancing rings are coaxially and rotatably mounted within the case annular chamber for rotational travel with the case. Each of the rings is in substantially coaxial alignment with the rotatable element and selectively rotatable in first and second opposing ring rotational directions relative to the other ring and to the case. Each ring has a central aperture through which the rotatable element extends in one embodiment. A first means, mounted to the case for rotational travel therewith, is provided for selectively rotating the first ring in the selected first ring first or second rotational direction by a desired amount. A second means, mounted to the case for rotational travel therewith, is provided for selectively rotating the second ring in the selected second ring first or second rotational direction by a desired amount. A third means, out of mechanical engagement with and external to the case is provided for selectively and independently controlling operation of the first and second means to progressively and independently rotate about each of the rings until the machine is dynamically balanced.

In a preferred embodiment of the invention, the first means includes a first fluid driven member selectively rotatable about a first member rotational axis in first member first and second opposing rotational directions in response to engagement by first source first and second pressurized fluid flows, respectively. The balancer further includes a first stationary fluid source selectively applying in response to a vibration sensor control signal or a manual adjustment the first source first pressurized fluid flow to rotate the first driven member in the first member first rotational direction, and the first source second pressurized fluid flow to rotate the first driven member in the first member second rotational direction.

Similarly, the second means includes a second fluid driven member selectively rotatable about a second member rotational axis in second member first and second opposing rotational directions in response to engagement by second source first and second pressurized fluid flows, respectively. The balancer further includes a second stationary fluid source selectively applying the second source first pressurized fluid flow to rotate the second driven member in the second member first rotational direction, and a second source second pressurized fluid flow to rotate the second driven member in the second member second rotational direction.

First force transmission means, mounted to the case for rotational travel therewith, is provided for drivably interconnecting the first driven member and a first ring engagement portion to convert rotation of the first driven member in the first member first and second rotational directions into rotation of the first ring in the first ring first and second rotational directions, respectively. Similarly, second force transmission means, mounted to the case for rotational travel therewith, is provided for drivably interconnecting the second driven member and a second ring engagement portion to convert rotation of the second driven member in the second member first and second rotational directions into rotation of the second ring in the second ring first and second rotational directions, respectively. As such, the first and second driven members are rotated in selected directions under the fluid flows when selectively applied by the stationary first and second sources during each pass thereby as the first and second driven members revolve with the case. This produces rotation of the first and second rings to dynamically balance the machine.

In the preferred embodiment the first and second force transmission means include reduction gears with a sufficiently large gear reduction ratios that under normal operation the rings exert insufficient force on the gears to rotate the first and second driven members, so the rings are maintained by the gears locked in the rotational position to which move by the first and second driven members in response to the first and second source pressurized fluid flows.

In the preferred embodiment, the first and second driven members are wheels with outwardly projecting vanes to engage the first or second pressurized fluid flows and cause the wheels to rotate. The wheels are positioned within recesses in the case outer wall portion. Pressurized air may be used as the fluid, and the first and second fluid sources may include pneumatic nozzles to direct the air toward the vanes of the wheels. The flow of fluid to the nozzles may be controlled by a plurality of control valves.

The annular case has an inner wall portion defining the central case aperture, and the rings each include an inner wall portion defining the central ring aperture. The case inner wall portion extends fully through the inner wall portions of the rings and rotatably supports the rings by use of anti-friction bearings disposed between the case inner wall portion and the ring inner wall portions.

In an alternative embodiment of the invention, the first member is a first frictional engagement wheel and the second member is a second frictional engagement wheel. The balancer also includes a first contact apparatus selectively movable to frictionally contact the first engagement wheel on opposing sides thereof to thereby selectively rotate the first engagement wheel in a first wheel first or second rotational direction as the first engagement wheel travels by the first contact apparatus. A second contact apparatus is selectively movable to frictionally contact the second engagement wheel on opposing sides thereof to thereby selectively rotate the second engagement wheel in a second wheel first or second rotational direction as the second engagement wheel travels by the second contact apparatus. This rotation of the first and second engagement wheels causes rotation of the rings, respectively, in the manner set forth above.

In a presently preferred embodiment of this alternative embodiment, the first and second contact apparatus each has a pivotally movable body with a pair of spaced apart sidewalls projecting to opposite sides of a corresponding one of the first or second engagement wheels. The sidewalls define an open channel therebetween having a substantially unobstructed length and being oriented such that the corresponding engagement wheel can pass freely through the channel when traveling thereby out of contact with the sidewalls when the body is pivoted into a neutral position. The body is also pivotable to positions to each side of the neutral position to selectively frictionally contact one or the other of the sidewalls with the corresponding engagement wheel to rotate the engagement wheel in the desired engagement wheel first or second rotational direction, and thereby rotate the corresponding one of the rings in the desired direction.

In another embodiment the case is adapted to attach to the free face of an end of the rotatable element and the first and second force transmission means are mounted within the space defined interior of the ring central apertures.

Other features and advantages of the invention will become apparent from the following detailed description, taken in conjunction with the accompanying drawings.

BRIEF DESCRIPTION OF THE DRAWINGS

FIG. 5 is an enlarged sectional view taken substantially along the line 5—5 in FIG. 2.

FIG. 6 is an enlarged sectional view taken substantially along the line 6—6 in FIG. 2.

FIG. 6A is an enlarged fragmentary sectional view taken substantially along the line 6A—6A in FIG. 2.

FIG. 8 is a fragmentary sectional front elevational view of an engagement wheel and gear reduction assembly used in an alternative embodiment of the present invention.

FIG. 9 is a fragmentary sectional edge side elevational view of a pair of engagement wheels of the type shown in FIG. 8 used in the alternative embodiment of the invention, also showing a pair of pivotally mounted contact channels.

FIG. 10 is a reduced scale, fragmentary, sectional side elevational view of the ring balancer of FIG. 1 shown mounted in position on a grinding machine between a machine wall and an inner spindle flange.

BEST MODE FOR CARRYING OUT THE INVENTION

Figure 1:
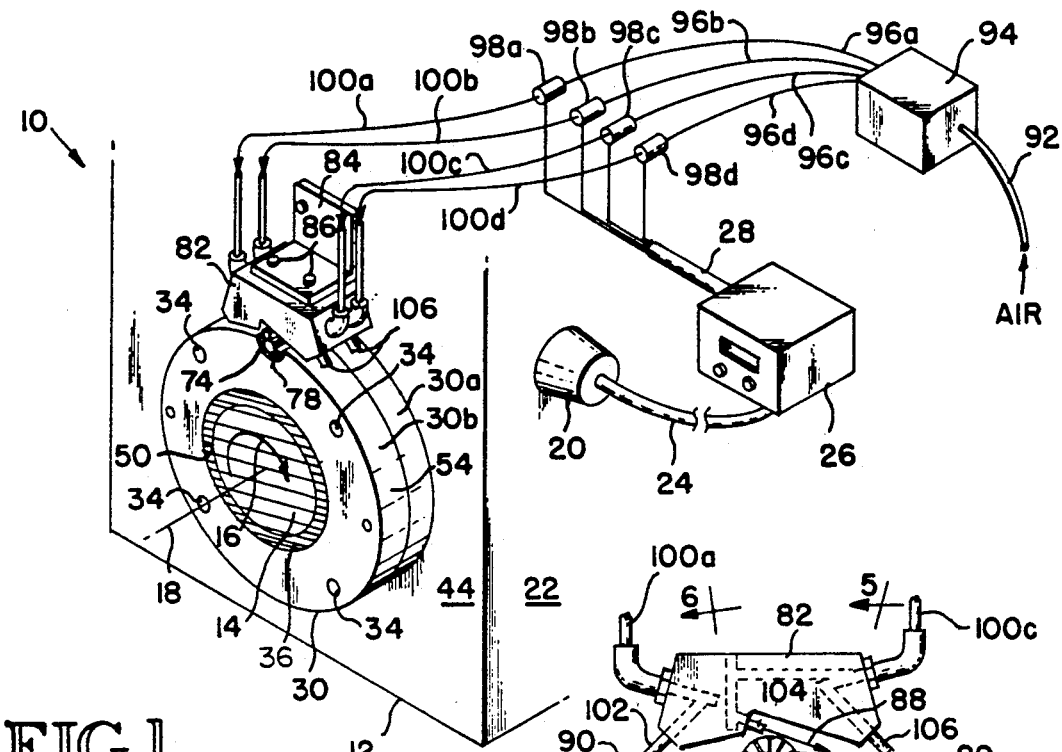
FIG. 1 is a fragmentary sectional isometric view of the ring balancer of the present invention with a portion of the electronic and pneumatic controls being shown schematically, with the ring balancer shown mounted on the rotatable shaft of a grinding machine.

As shown in the drawings for purposes of illustration, the present invention is embodied in a balancer, indicated generally by reference numeral 10, for dynamically balancing a machine 12 having an elongated, rotatable shaft 14. The shaft 14 is power driven in at least a first rotational direction, shown in FIG. 1 as being the clockwise direction indicated by arrow 16, about a longitudinal rotational axis indicated by phantom line 18. The balancer 10 is usable with a vibration sensor 20 magnetically attached to a sidewall 22 of the machine 12 to detect vibration of the machine. The vibration sensor sends electrical signals over an input cable 24 to an electronic analyzer/controller 26 which produces electrical control signals on an output cable 28. As will be described below, the control signals are used to control the operation of the present invention. The vibration sensor 20 and the controller 26 are of conventional design.

Figure 2:
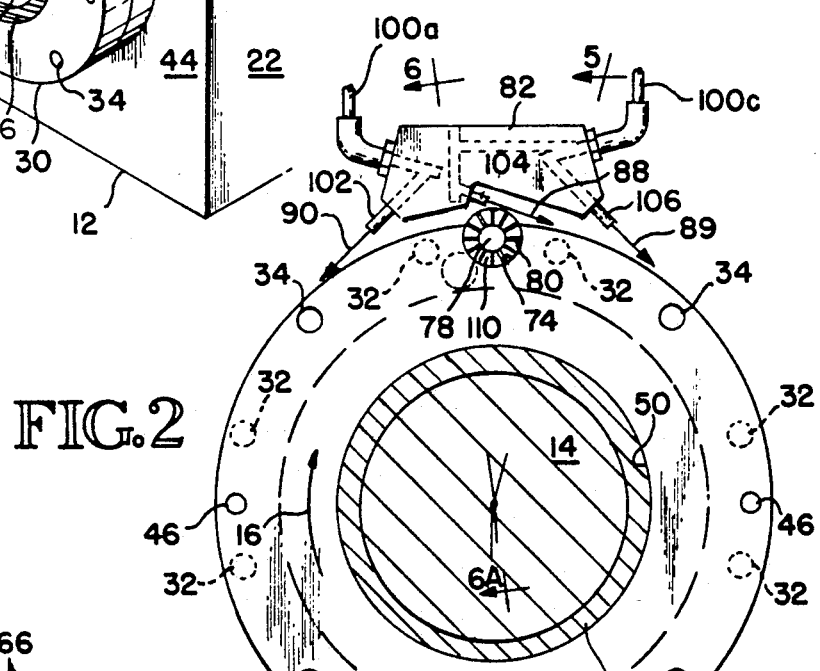
FIG. 2 is an enlarged sectional front elevational view of the ring balancer shown in FIG. 1.

In accordance with the present invention, the ring balancer includes an annular case 30 which, as best shown in FIGS. 5 and 6, includes inner and outer case halves 30a and 30b, respectively, which are mateably connected together by a plurality of symmetrically positioned screws 32 (see FIG. 2). A pair of mating alignment holes and pins 46 are used to align the case halves 30a and 30b on assembly. The case 30 is also provided with a plurality of smooth throughbores 34 (see FIGS. 1 and 2) which pass completely through both the inner and outer case halves 30a and 30b for fixed, although removable, attachment of the case to the shaft 14 using a plurality of attachment bolts 38. As shown in FIG. 10, the case 30 is attached with its outer case half 30b in juxtaposition with an inner side 35 of an inner spindle flange 36 with the attachment bolts 38 passing through the throughbores 34 and threadably received in threaded attachment holes in the spindle flange. It is noted that while the inner spindle flange 36 is described herein as part of the shaft 14, it is a separable part and forms a portion of the assembly shown in FIG. 10 used to removably mount a grinding wheel 40 to the shaft 14. The assembly further includes an outer spindle flange 42 which is removably attached to the inner spindle flange 36 and holds the grinding wheel 40 positioned therebetween.

One of the significant improvements of the present invention is that the balancer 10 no longer must be mounted at the free end of the shaft 14 outward of the grinding wheel 40, but rather can be mounted between the inner spindle flange 36 and an outward facing wall 44 of the machine 12. In such manner, it is no longer necessary to remove the balancer 10 each time the grinding wheel 40 must be removed. Furthermore, the balancer 10 is located substantially inward from the shaft free end and close to the grinding wheel 40. Thus, the balancer 10 does not add any weight to the shaft free end as do prior art balancers, and axial shaft imbalances created by the mounting of the balancer which can cause lateral wobbling of the grinding wheel are minimized. In addition, and as will be described in more detail below, by location of the balancer 10 immediately adjacent to the grinding wheel 40, where at the shaft imbalance is usually located, the balancing masses needed to compensate for an imbalance are significantly smaller as compared to when attached at the shaft free end, since the balancing masses are positioned closer to the point of imbalance. This weight reduction further reduces any adverse impact that attachment of the balancer to the shaft 14 might otherwise have.

As best shown in FIGS. 5 and 6, the annular case 30 has a circular central wall portion 48 formed by corresponding central wall portions of each of the case halves 30a and 30b to define a central aperture 50 sized to receive tightly therein the rotatable shaft 14. The case 30 further has an interior annular chamber 52 extending fully about the case central aperture 50 and formed to be in coaxial alignment with the rotatable shaft 14 when the case 30 is mounted on the shaft. The outer perimeter of the case 30 is defined by a circumferential outer wall portion 54.

Coaxially and rotatably mounted within the case annular chamber 52 in juxtaposition are inner and outer eccentrically weighted balancing rings 56 and 58, respectively. The inner balancing ring 56 is shown in FIG. 3 disassembled from the case 30, and since the balancing rings 56 and 58 are identical in construction, inner balancing ring 56 will be described herein as illustrative of both balancing rings.

Figure 3:
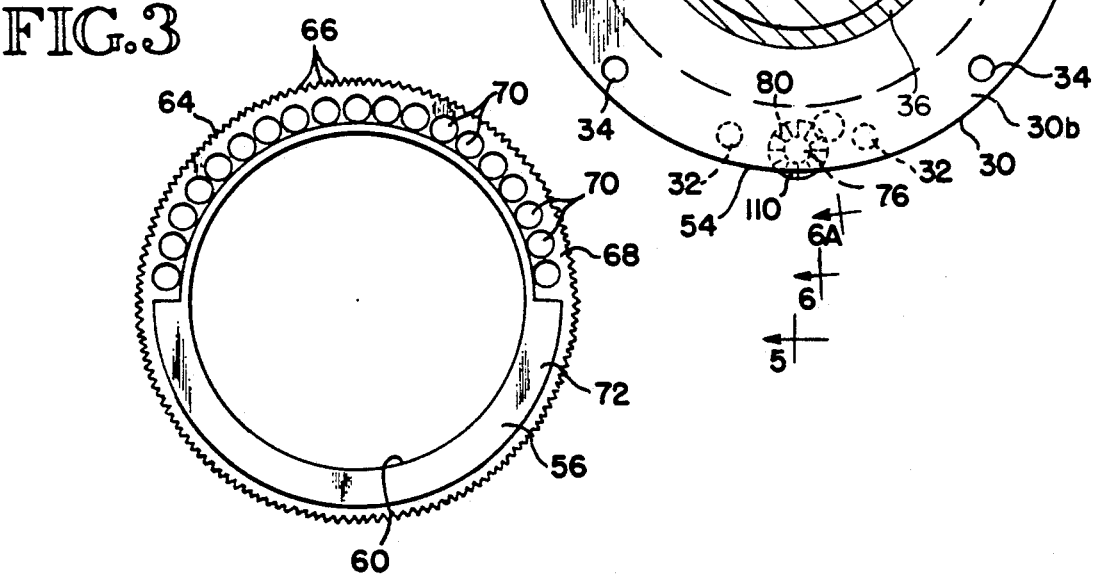
FIG. 3 is an enlarged front elevational view of one of two balancing rings used in the ring balancer of FIG. 1 shown removed from the balancer case.

As shown in FIG. 3, 5 and 6 the inner balancing ring 56 has a central aperture 60 with a diameter sized sufficiently larger than the diameter of the case central wall portion 48 so as to leave a space therebetween in which a pair of flexible bearing strips 62 are positioned, one inward of each ring. The bearing strips 62 comprise a plurality of axially oriented anti-friction needle bearings. In such manner the case central wall portion 48 rotatably and separately supports each of the balancing rings 56 and 58 for independent rotation relative to each other and the case 30.

Again referring to FIG. 3, the inner balancing ring 56 includes a circumferentially extending outer surface 64 having gear teeth 66 formed therein along the entire circumferential length of the surface to provide a toothed crown-wheel. When the balancing rings 56 and 58 are mounted within the case annular chamber 52 for rotational travel with the case 30 as the case rotates with the shaft 14, the balancing rings 56 and 58 are in substantially coaxial alignment with the rotatable shaft 14. Each of the balancing rings 56 and 58 is selectively rotatable in either rotational direction using the gear teeth 66 of the ring, as will be described in detail below, to move the rings relative to each other and to the case 30. As such, while the rings rotate in unison with the rotating case, each ring is independently rotatable relative to the other ring and the case for adjustment purposes.

The inner balancing ring 56 has a one-half portion 68 extending approximately halfway about the ring which is cut away to a reduced thickness and has a plurality of holes 70 formed therein to lighten that half-portion of the ring. This causes the ring to be eccentrically weighted. A remaining half-portion 72 of the ring has its full thickness. The lightened half-portion 68 of the ring 58 is shown in more detail in FIG. 4. The outer surface 64 in which the gear teeth 66 are formed has a reduced thickness and is positioned toward one side of the ring. As shown in FIGS. 5 and 6, the inner and outer rings 56 and 58 are mounted in the case annular chamber 52 with the reduced thickness gear surfaces 64 of the rings positioned adjacent each other.

Each of the inner and outer case halves 30a and 30b receives one of a pair of inner and outer turbine wheels 76 and 78, respectively, in a recess 74 formed in the circumferential outer wall portion 54. Each of the turbine wheels 76 and 78 is rotatably mounted to the case 30 for rotation about a rotational axis generally parallel to the axis 18 of the rotatable shaft 14. As such, the turbine wheels are carried by the case 30 as it rotates with the shaft 14, and each is also rotatable about its own axis. The turbine wheels 74 and 76 each have a plurality of radially outward projecting vanes 80 to be deflected by a pressurized air flow to rotate the turbine wheel about its axis during at least a part of the circular path the turbine wheels are carried through during each revolution of the case 30. As shown in FIG. 5 for the inner case half 30a, the recesses 74 have a depth such that the turbine vanes 80 project outwardly beyond the circumferential outer wall portion 54.

The turbine wheels 74 and 76 may be selectively rotated, as desired, in a clockwise or a counterclockwise direction, as viewed in FIG. 2, by pressurized air flows produced by a manifold 82 mounted radially outward of the case 30 and in proximity therewith. As shown in FIG. 1, the manifold 82 is mounted stationary to the wall 44 of the machine 12 using a bracket 84 and attachment bolts 86. The manifold 82 is positioned relative to the case 30 and the turbine wheels 74 and 76 so as to be able to generate pressurized air flows to selectively rotate the turbine inner or outer wheels 76 or 78, or both as they are carried past the manifold 82 by the rotating case 30, and to independently rotate the turbine wheels in either rotational direction about the wheel's axis in response to electrical signals generated on the cable 28 by the controller 26 based upon vibration measured by the sensor 20.

As best shown in FIG. 2 for the outer turbine wheel 78, the manifold 82 generates a pair of air flows in the directions indicated by the arrows 88 and 89 which are generally transverse to the rotational axis 18 of the shaft 14 and tangential to the outer wall portion 54 of the case 30 to rotate the outer turbine wheel 78 in a clockwise rotational direction (as viewed in FIG. 2). The manifold 82 also generates a pressurized air flow in the direction indicated by the arrow 90 which is generally transverse to the rotational axis 18 of the shaft 14 and tangential to the outer wall portion 54 of the case 30, to rotate the outer turbine wheel 78 in a counterclockwise rotational direction (as viewed in FIG. 2). Similar but separate pressurized air flows are generated by the manifold 82 for the inner turbine wheel 76, but are spaced apart in the axial direction from the air flows for the outer turbine wheel 78, behind the air flows illustrated in FIG. 2.

It is noted that since the rotational direction 16 of the shaft 14 is in the clockwise direction, the outer turbine wheel 78 is carried by the rotating case 30 directly into the pressurized air flow 90, but in the same general direction as the pressurized air flows 88 and 89. As such, while the outer turbine wheel 78, as it is being carried by the case 30 past the manifold 82, tends to receive the full force of the pressurized air flow 90, it is traveling with pressurized air flows 88 and 89 and hence the relative velocity therebetween and the force imparted to the vanes 80 of the wheel by each of the air flows 88 and 89 is decreased. In order to compensate for this, the two air flows 88 and 89 are provided to rotate the outer turbine wheel 78 in the clockwise direction, while only the single air flow 90 is provided to rotate the wheel in the counterclockwise direction.

The air used to create the air flows 88, 89 and 90 for each of the turbine wheels 76 and 78 may be supplied by a pre-existing pressurized shop air supply or by an air pump, as desired. As shown in FIG. 1, pressurized air is supplied by way of an air conduit 92 to a pressure regulator 94 which regulates the air pressure to a substantially constant pressure. The pressure regulator 94 also distributes the regulated pressurized air over four air conduits 96a, 96b, 96c, and 96d to four solenoid air valves 98a, 98b, 98c and 98d, respectively. The solenoid valves are opened and closed in response to the electrical command signals supplied by the controller 26 over the cable 28.

Figure 7:
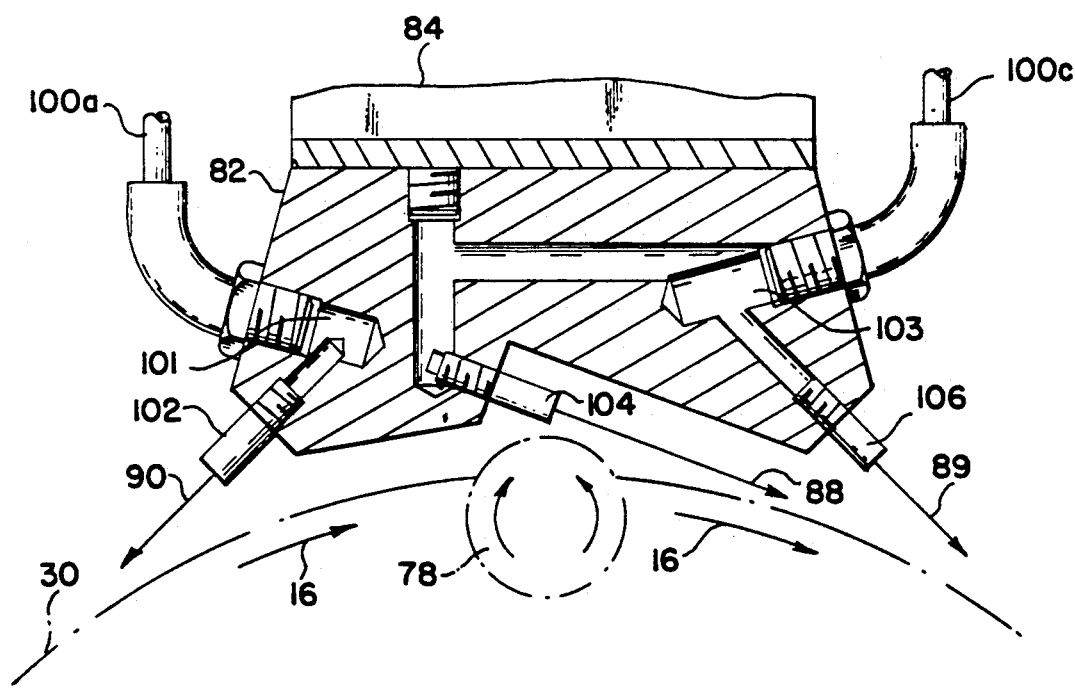
FIG. 7 is an enlarged sectional view of a fluid manifold of the balancer shown in FIG. 1.

The solenoid valves 98a, 98b, 98c and 98d selectively supply over four air supply conduits 100a, 100b, 100c and 100d, respectively, regulated pressurized air to the manifold 82. As best shown in FIG. 7, the supply line 100a is connected to an interior channel 101 of the manifold 82 which supplies regulated pressurized air to a nozzle 102 which supplies the pressurized air flow 90 to rotate the outer turbine wheel 78 in the counterclockwise direction. The supply conduit 100c is connected to an interior channel 103 of the manifold 82 which supplies regulated pressurized air to a pair of nozzles 104 and 106 which supply the pressurized air flows 88 and 89, respectively, to rotate the outer turbine wheel 78 in the clockwise direction.

In similar manner, the air supply conduits 100b and 100d are connected to a separate but identical set of manifold channels 101 and 103 and nozzles 102, 104 and 106 to supply pressurized air flow to rotate the inner turbine wheel 76. As previously noted, the inner and outer turbine wheels 76 and 78 are offset in the direction of the rotational axis 18 of the shaft 14, as are the sets of manifold nozzles which correspond to the turbine wheels. While the turbine wheels are positioned axially offset relative to each other on the case 30, in order to further isolate the turbine wheels from any unintended cross air flows applied by the set of nozzles for the other turbine wheel, each turbine wheel has a thin solid disk 110 mounted to an axially inward side thereof to help block such unintended cross air flows.

Figure 4:
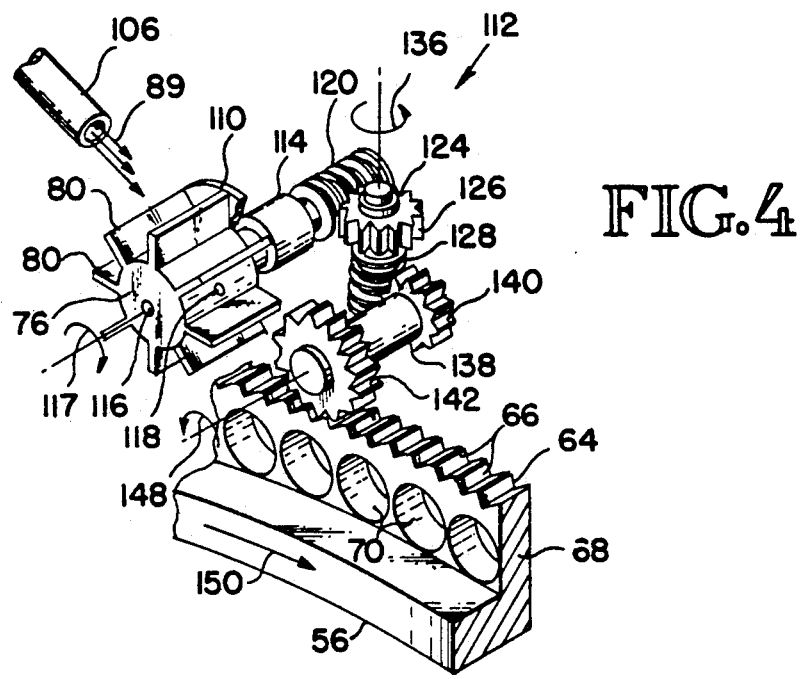
FIG. 4 is an enlarged fragmentary sectional isometric view of the balancing ring shown in FIG. 3 showing a turbine wheel and associated reduction gears which adjustably rotate the ring in response to a directed fluid flow.

As noted above, the selected clockwise or counterclockwise rotation of the inner and outer turbine wheels 76 and 78 is accomplished in order to rotate the inner and outer balancing rings 56 and 58 relative to each other and relative to the case 30. By proper positioning of the balancing rings, it is possible to compensate for imbalances in the shaft caused by the shaft or the grinding wheel 40 it carries and thereby eliminate vibration. The inner and outer balancing rings 56 and 58 are independently rotatable to adjust for imbalances by use of a pair of reduction gear assemblies 112. One such assembly which is used in conjunction with the inner turbine wheel 76 and the inner balancing ring 56 is illustrated in FIG. 4 without the case 30 for clarity. Operation of this assembly is also illustrated in sectional views of FIGS. 5, 6 and 6A. While this reduction gear assembly will be described as operating with inner turbine wheel 76 and inner balancing ring 56, it is to be understood that an identical reduction gear assembly is provided for operation with the outer turbine wheel 78 and the outer balancing ring 58.

As shown in FIGS. 4 and 5, the inner reduction gear assembly 112 includes a first gear shaft 114 oriented transverse to the case and parallel to the shaft axis 18, and having an end portion 116 to which the inner turbine wheel 76 is fixedly attached by a set screw 118. Through the force of the pressurized air flows 88 and 89 on the vanes 80, the inner turbine wheel 76 is caused to rotate clockwise as shown by arrow 117 in FIG. 4 or through the force of the pressurized air flow 90 on the vanes the inner turbine wheel is caused to rotate counterclockwise each time the wheel is carried past the manifold 82 by the rotating case 30. Rotation of the inner turbine wheel 76 produces a similar rotation of a worm gear 120 on an opposite end portion of the first gear shaft 114. A pair of bearings 122 (see FIG. 5) are positioned in a first gear shaft transverse bore 124 in the case 30 to rotatably support the first gear shaft 114.

As shown in FIGS. 4 and 6, the inner reduction gear assembly 112 further includes a radially oriented second gear shaft 124 having a pinion gear 126 at one end which engages the worm gear 120 of the first gear shaft 114, and a worm gear 128 on an opposite end portion. The second gear shaft 124 is rotatably supported in a radial bore 130 in the case 30 by a pair of bearings 132 (see FIG. 6), with one bearing being positioned in a bearing cap 134 which is fixedly attached to the case 30. As shown in FIG. 4, rotation of the inner turbine wheel 76 in the clockwise rotational direction indicated by arrow 117 produces rotation of the second gear shaft 124 in the rotational direction indicated by arrow 136.

As shown in FIGS. 4 and 6A, the inner reduction gear assembly 112 further includes a third gear shaft 138 having a pinion gear 140 at one end which engages the worm gear 128 of the second gear shaft 124, and a gear 142 at an opposite end which engages the gear teeth 66 of the circumferential surface 64 of the inner balancing ring 56. The third gear shaft 138 is rotatably supported in a transverse bore 144 in the case 30 by a pair of bearings 146 (see FIG. 6A). As shown in FIG. 4, rotation of the second gear shaft 124 in the rotational direction indicated by arrow 136 produces a counterclockwise rotation of the third gear shaft 138 and the gear 142 it carries, as indicated by arrow 148. This counterclockwise rotation of the gear 142 produces a clockwise rotation of the inner balancing ring 56 about its axis, as indicated by arrow 150.

In such manner, the inner turbine wheel 76 is rotated clockwise in response to periodic application of the pressurized air flows 88 and 89 by the nozzles 104 and 106, which occurs every time the case 30 rotates to bring the inner turbine wheel into the influence of the air flows 88 and 89, when the air flow is present as a result of operation of the valve 98d. The inner turbine wheel 76 is preferably rotated from about one-half to four revolutions for each pass of the inner turbine wheel by the manifold 82. This rotational movement of the inner turbine wheel 76 produces clockwise rotation of the inner balancing ring 56 about its axis, preferably with a small angular movement resulting from each pass by the manifold 82.

In the presently preferred embodiment of the invention, the inner reduction gear assembly 112, as well as the outer reduction gear assembly which, as noted above, is identical, has a gear reduction ratio of about 5000:1. Thus, many revolutions of each turbine wheel are required to produce one revolution of the corresponding gear 142 that adjustably drives the corresponding balancing ring. The exact number of turbine wheel revolutions the air flow produces each time the turbine wheel is carried past the manifold 82 by the rotating case 30 depends upon the pressure level of the pressurized air flows to which it is subjected, and also upon the rotating speed of the machine shaft 14, since the faster the rotation the shorter the duration the turbine wheel is exposed to the air flow. As a result, it cannot be predetermined with precision exactly how many passes by the manifold will be required to rotate the balancing ring by one degree. However, in a presently preferred embodiment of the invention with the shaft 114 rotating at 1500 rpms and assuming that the turbine wheel rotates anywhere from one-half to four revolutions each time it passes by the manifold 82, and using a gear reduction ratio for the reduction gear assembly 112 which requires 14 revolutions of the turbine wheel to rotate the balancing ring one degree relative to the case 30, anywhere from 3.5 to 28 passes by the manifold will be required to rotate the balancing ring one degree. As such, if the balancing ring is positioned to require the maximum 180 degree angular movement possible before it is brought to the ultimate position which eliminates the imbalance, the balancing ring would at most be required to make anywhere from 630 to 5040 passes by the manifold. Since the machine shaft 114 is rotating at 1500 rpms, the time required to rotate the balancing ring the full 180 degrees will range from 0.42 minutes (i.e., 25.2 seconds) to 3.36 minutes (201.6 seconds). This provides, a relatively rapid adjustment even from the maximum deviation position of the balancing ring, but yet not so quickly that the balancer 10 is likely to have too coarse of an adjustment or overcompensate.

If it is desired to slow down or speed up the time to reach balance, this can be accomplished simply by adjusting the pressure of the regulated pressurized air. Similarly, if the balancer 10 is to be used with a machine 12 operating at a higher or lower shaft rotational speed, the pressure of the regulated pressurized air simply needs to be adjusted to maintain the maximum required adjustment time in the desired range. Of course, the actual adjustment time required to eliminate an imbalance is dependent upon the angular travel of the balancing ring required from its starting position to the point at which the imbalance is eliminated, which is less than the 180 degrees of travel used for the sample calculations provided above.

With the balancer of the present invention, multiple revolutions of the case 30 are required to achieve balance, with each revolution producing a small adjustment of the angular position of the balancing ring. As such, the imbalance can be progressively eliminated as the balancing rings 56 and 58 are moved until the vibration sensor 20 and the controller 26 working in combination detect that a balance situation has been achieved. At that time, whichever of the valves 98a–98d that have been open to supply the regulated pressurized air to the desired nozzles of the manifold 82 to provide the selected pressurized air flows producing the desired directional rotation of the turbine wheels are closed. Once closed, neither of the turbine wheels 76 and 78 will be exposed to a pressurized air flow as it passes by the manifold, and neither turbine wheel will be caused to rotate about its axis. Rather, the turbine wheel will simply be carried about by the rotating case 30 until a pressurized air flow is again supplied by the manifold 82 for purposes of further adjusting the corresponding balancing ring.

The balancer 10 can be operated periodically to eliminate any imbalance that may exist and then the controller 26 inactivated, or the controller can be operated on a continuous basis and cause pressurized air flows to be generated at the manifold 82 any time a significant level of vibration is sensed which indicates adjustment of either or both of the balancing rings 56 and 58 is necessary to remove the imbalance. As discussed above, each of the balancing rings 56 and 58 is independently adjusted by the pressurized air flows applied to its corresponding turbine wheel 76 or 78 using one of the two sets of nozzles 102, 104 and 106 positioned to drive the turbine wheel.

While the invention has been described herein for use with solenoid valves 98a–98d which are automatically operated by the controller 26, the present invention can be manually operated if desired. For manual operation, the controller 26 may be used to indicate the amount of imbalance and the direction of rotation of the balancing rings necessary. A set of manually operable control valves similar to the solenoid valves would be provided for the operator to selectively apply regulated pressurized air to the manifold 82.

As discussed above, one of the reduction gear assemblies 112 drivably interconnects one of the turbine wheels 76 or 78 to one of the corresponding balancing rings 56 or 58 to convert rotation of the turbine wheel in response to the pressurized air flow applied thereto into rotation of the balancing ring. The reduction gear assembly 112 also serves the purpose of locking the balancing ring in the rotational position to which it was moved by the turbine wheel in response to the pressurized air flow. This is accomplished by providing the reduction gear assembly 112 with a sufficiently large gear reduction ratio that under normal operation the balancing ring exerts insufficient force due to resulting inertia on the reduction gear assembly to cause back rotation of the turbine wheel. In this manner, the turbine wheels 74 and 76 and associated reduction gear assemblies 112 not only serve to progressively and independently rotate the balancing rings 56 and 58 until the machine 12 is dynamically balanced, once in a balanced condition the reduction gear assemblies lock the balancing rings in position within the case 30. The balancing rings are prevented from rotating relative to the case or each other and from undesirably moving from their respective positions for balance as a result of inertial forces on the balancing rings caused by slowing, stopping or acceleration of the shaft 14, even on start-up of the machine 12 if turned off after having first been balanced.

So as to provide an inherently balanced design for the balancer 10, the inner and outer turbine wheels 74 and 76, although axially offset, are positioned on the case 30 diametrically opposed to each other. Similarly, the reduction gear assemblies 112 associated with the turbine wheels are positioned within the case 30 diametrically opposed to each other. This balances the turbine wheels against each other, and the reduction gear assemblies against each other, to minimize imbalances in the construction of the balancer itself.

An alternative embodiment of the balancer 10' of the present invention is shown in FIGS. 8 and 9. In this embodiment, the balancer 10' uses a case 30' and inner and outer balancing rings 56 and 58 substantially identical to those disclosed for the embodiment of FIG. 1, except as will be described below. As with the first embodiment, inner and outer reduction gear assemblies 112' are utilized, with the reduction gear assembly for the inner balancing ring 56 being shown in FIG. 8. A first gear shaft 200 is radially oriented with a worm gear 202 at one end portion. The first gear shaft 200 is rotatably supported within the case 30' by a pair of bearings 204. The worm gear 202 drivably engages a pinion gear 206 at one end of a transverse second gear shaft 208 having an axis of rotation oriented parallel to the rotational axis 18 of the shaft 14. The second gear shaft 208 also carries at an opposite end a gear 210 which drivably engages the gear teeth 66 of the circumferential surface 64 of the inner balancing ring 56 to adjustably rotate the balancing ring relative to the other balancing ring and the case to eliminate imbalance in the same manner as described for the embodiment of FIG. 1. In this embodiment, only two gear shafts are used for each reduction gear assembly 112'; but as before the reduction gear assembly also serves to lock the balancing ring in position.

The most significant difference between this embodiment and the first embodiment of FIG. 1 is the manner in which the first gear shaft 200 is selectively rotated in one or the other of opposing rotational directions, as desired. An end portion 212 of the first gear shaft 200 projects outward beyond the outer wall portion 54 of the case 30' and has fixedly attached thereto a friction engagement wheel 214 having a solid rubber exterior surface. As shown in FIG. 9, inner and outer friction engagement wheels 214 are provided, each drivably interconnected with a corresponding one of the inner and outer balancing rings 56 and 58 to rotate the balancing rings. In this embodiment, however, no manifold or pressurized air flows are used to selectively rotate the wheels to adjust the position of the balancing rings in the case 30. Instead, a downwardly opening elongated contact channel 216 is used in association with each of the friction engagement wheels 214. The contact channels 216 are mounted on a bracket 218 which is fixedly attached to the stationary sidewall of the machine 12.

Each of the contact channels 216 includes a body portion 220 which is pivotally attached by a pivot pin 222 to the bracket 218 so as to be pivotally movable in clockwise and counterclockwise directions, as viewed in FIG. 9, in response to the control signals provided by the controller 26. Each of the contact channels 216 further includes a pair of spaced-apart sidewalls 224 projecting to opposite axially outward sides of the corresponding friction engagement wheel 214 to define a channel opening 225 therebetween having an unobstructed length. The contact channel 216 is oriented such that the corresponding engagement wheel 214 passes freely through the channel opening 225 out of contact with the sidewalls 224 when traveling thereby as the engagement wheel is carried by the rotating case 30'. In this neutral position, the frictional engagement wheel is not caused to rotate about its axis, and the corresponding reduction gear assembly 112' locks the corresponding balancing ring in position.

The body portion 220 of the contact channel 216 is pivotable about the pivot pin 222 to a position to each side of the neutral position to move one or the other of the sidewalls 224 of the contact channel so as to be in frictional contact with the corresponding engagement wheel 214 as the revolving case 30' carries it through the channel opening 225. This contact with the sidewalls 224 as it passes through the channel opening causes drag on one or the other side of the engagement wheel 214 to selectively rotate the engagement wheel in one or the other of opposite rotational directions about the axis of the first gear shaft 200.

As previously discussed, rotation of the gear shaft 200 is converted into rotational movement of the corresponding balancing ring to adjust out imbalances in the machine shaft 14. By pivoting the body portion 220 in one direction or the other, rotation of the corresponding engagement wheel 214 in the desired direction is achieved; and, hence, rotational movement of the corresponding balancing ring is achieved in the desired direction to selectively adjust the balancing ring.

Much like in the first embodiment, with the duration of exposure of the turbine wheels 76 and 78 to the pressurized air flow being determinative of the amount of rotation of the turbine wheel produced during each pass by the manifold 72, in this alternative embodiment of the invention the length selected for the sidewalls 224 of the contact channel 216 determines the duration of contact and rotation of the engagement wheel 214 which can be accomplished on each pass of the engagement wheel 214 by the contact channel. Also, the greater the rotational speed of the shaft 14 on which the case 30' is mounted, the more often the engagement wheel 214 will come into contact with the sidewalls during any period of time. The type of materials used to fabricate the contact channel 216 and the engagement wheel will determine the amount of friction involved which also has an effect on the rotation produced by each pass.

The inner and outer contact channels 216 are shown in FIG. 9, with one being in the neutral position so that the engagement wheel 214 can pass through the channel opening 225 without being rotated and with the other being pivoted to a position to engage one of the sidewalls 224 with the engagement wheel to cause its rotation. If this last-mentioned contact channel were pivoted to an opposite position, the other of the sidewalls 224 would engage the engagement wheel 214 and thus reverse the direction of rotation of the wheel created by the contact with the sidewall of the contact channel.

As shown in FIG. 9, control of the pivotal movement of the body portion 20 about the pivot pin 222 is accomplished using a pair of movable air actuated pistons 226 and 228 for each of the control channels 216. The pistons 226 and 228 each carry a pair of engagement arms 230, with one arm being positioned to each side of the pivot pin 222 in contact with a corresponding recess 232 in the body portion 220. The pistons 226 and 228 each have an associated spring 234 to spring load the pistons to apply a resilient force in the direction of the contact channel 216 to each side of the pivot pin 222 and cause the contact channel to be self-centering into the neutral position when the actuation forces on the pistons for the contact channel are removed. The actuation forces can be applied using solenoid valves automatically operated by the controller 26 as with the first embodiment of the invention to selectively supply air pressure to each of the pistons 226 and 228 to cause extension of the associated arm 230, as desired.

Alternatively, electrically driven extendible devices can be used. As with the first embodiment, these controls can also be manually actuated, using the controller only to indicate the amount of actuation and the direction of rotation required for the balancing rings.

With the first embodiment of the invention, no electrical coupling or mechanical contact of the stationary control components of the balancer 10 are required with the rotating components, since control is accomplished by the application of pressurized air flows. As such, all problems associated with maintaining good electrical contact are eliminated. Similarly, without any mechanical contact, it is not necessary to utilize seals to keep out moisture or other contaminants, and all problems associated with mechanically connecting together a stationary part and a revolving part are eliminated.

While the alternative embodiment does require a limited mechanical contact between the stationary control components and the rotating components of the balancer 10, it does eliminate the problems associated with maintaining good electrical contacts. Additionally, it is noted that with the alternative embodiment of the invention, no external power is required to be supplied to the rotating case. The kinetic energy of the rotating components of the balancer is used to supply the energy to rotate the engagement wheels and hence the balancing rings, with this energy being supplied by the shaft 14 of the machine 12 through the rotational drive it applies to the case 30' fixedly attached thereto. It is not necessary to supply electrical or any other form of energy from an exterior source to cause the rotation. Of course, this embodiment has the same advantage provided with the first embodiment of eliminating the weight, cost, inaccuracies and maintenance problems associated with electric motors and electrical connectors.

With both embodiments of the invention, the annular case and balancing ring design allows the positioning of the balancing rings immediately adjacent to the grinding wheel 40. As such, smaller balancing masses are required to compensate for an imbalance than would be required if the balancing masses were located distant from the grinding wheel, such as at the shaft free end. The reduced weight of the present invention also means less axial moment is created on the shaft 14 by the balancer itself, thus a significant cause of lateral wobble in the grinding wheel is effectively eliminated.

Figure 11:
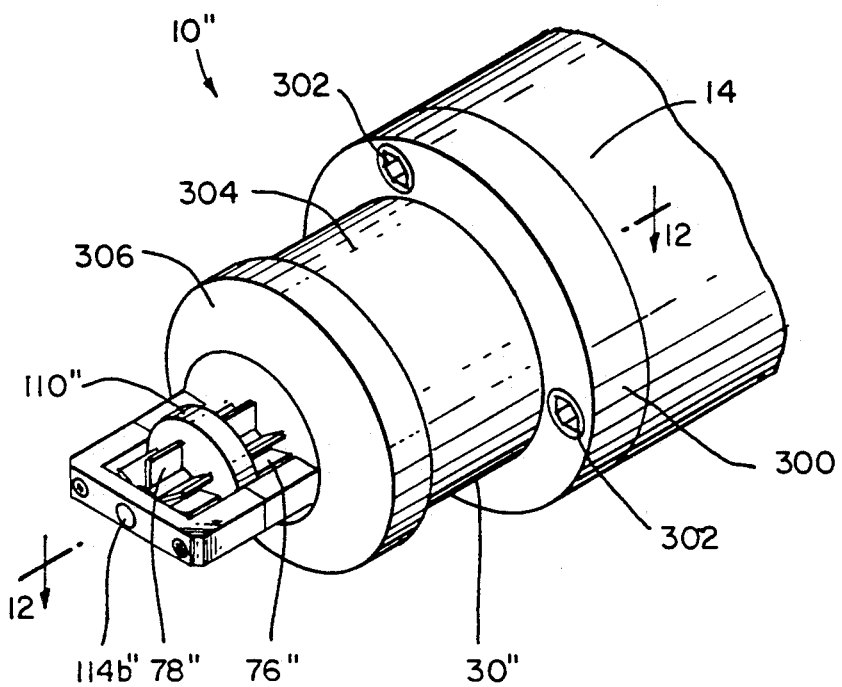
FIG. 11 is an isometric view of another alternative embodiment of the balancer shown mounted on the shaft free end of a grinding machine.
Figure 13:
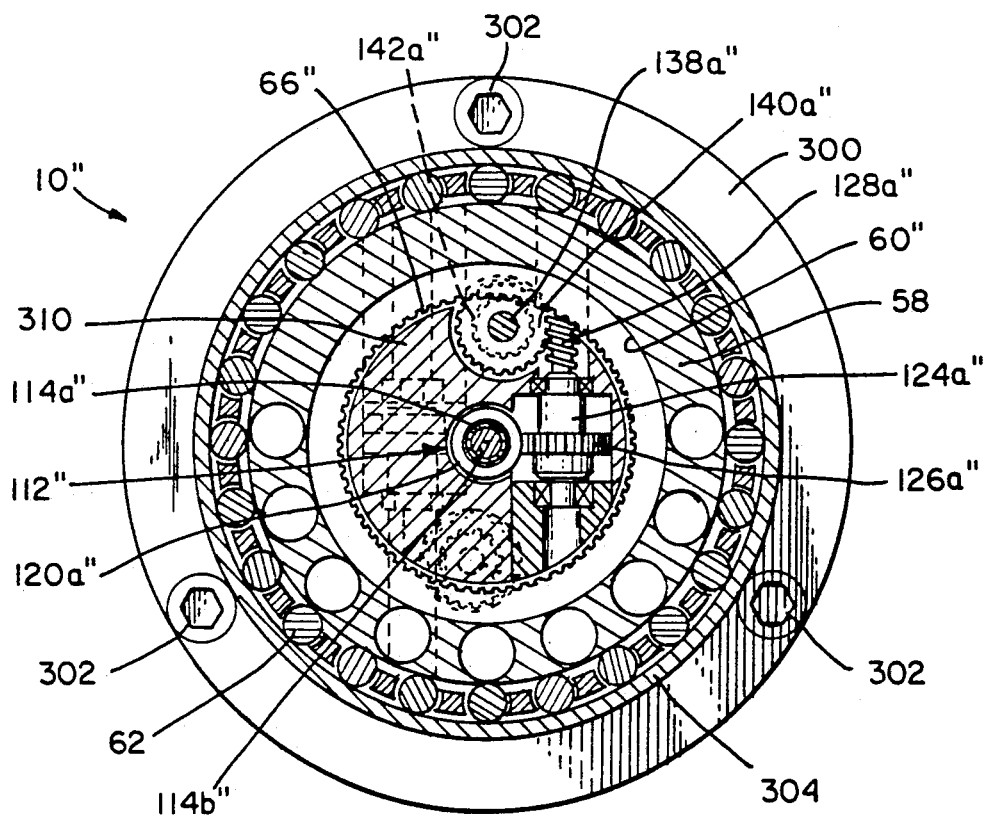
FIG. 13 is a reduced scale sectional view taken substantially along the line 13—13 in FIG. 12.
Figure 12:
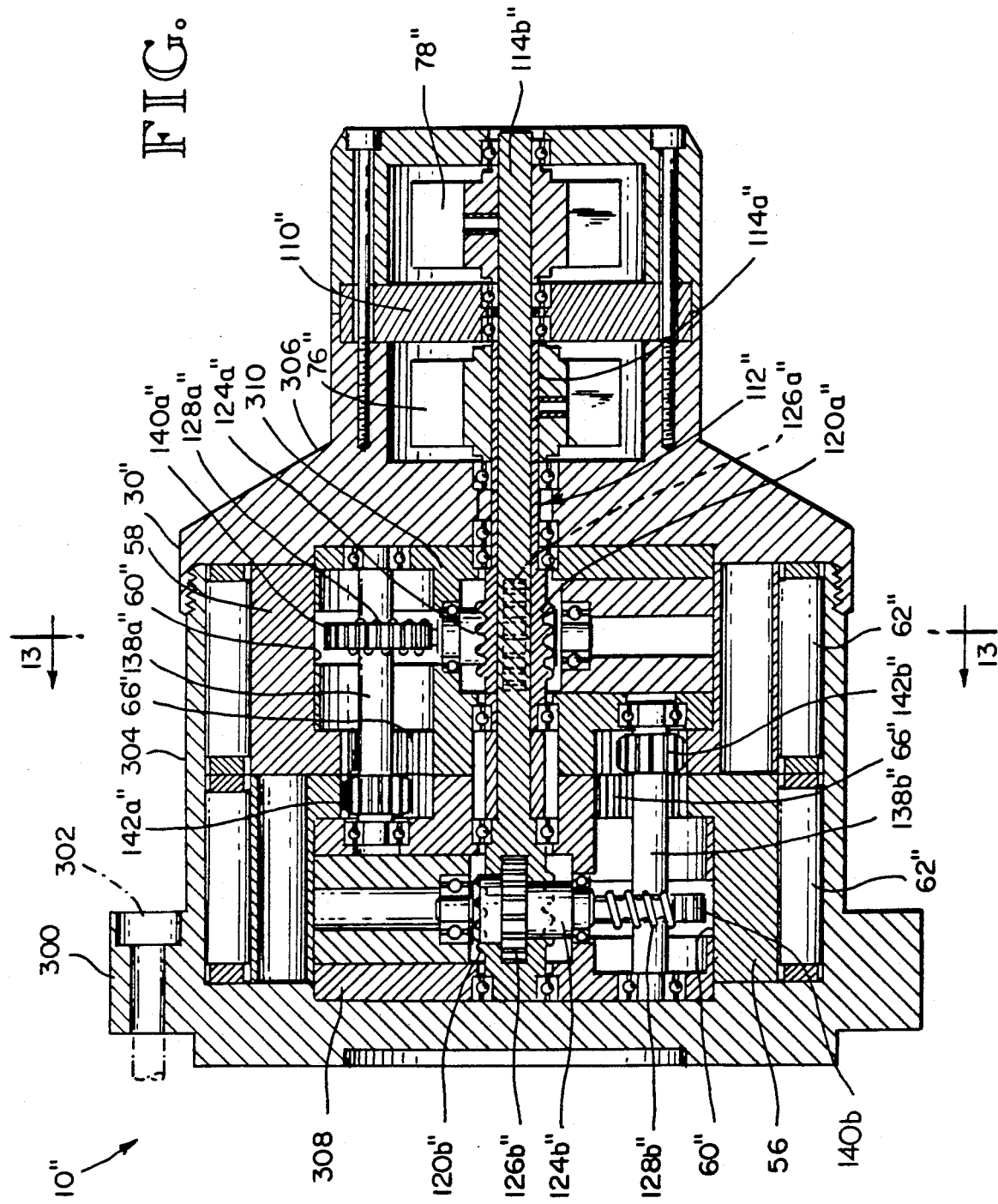
FIG. 12 is an enlarged sectional view taken substantially along the line 12—12 in FIG. 11.

A third embodiment of the balancer 10" is shown in FIGS. 11, 12 and 13. In this embodiment, the balancer 10" is constructed to mount on the free end of the shaft 14, as compared to the prior embodiments where the shaft passes through a central aperture of the balancer case so that the balancer can be positioned immediately adjacent to the grinding wheel inner spindle flange. The case 30" of the balancer 10", as best shown in FIG. 12, has a base 300 which is mounted to the end face of the free end of the shaft 14. The case 30" is attached to the end face using bolts extending through three mounting bolt apertures 302 so as to rotate with the shaft. As with the prior embodiments, the balancer 10" includes eccentrically weighted inner and outer balancing rings 56" and 58", respectively, each supported by bearing strips 62". In this embodiment the bearing strips are located outward of each ring to support the rings for independent rotation relative to each other and the case 30". The balancing rings 56" and 58" also each have circumferentially arranged gear teeth 66", but in this embodiment the teeth are formed along an inside surface.

Since the balancer 10" is not designed to fit around the shaft 14 but rather to be mounted on its free end face, the central aperture 60 of each ring defines an interior space within the case 30" interior of the balancing rings 56" and 58" which is used for placement of the reduction gear assemblies 112". These assemblies are used to transmit the adjustment force to the balancing rings 56" and 58" generated by a pair of inner and outer turbine wheels 76" and 78", respectively, rotatably mounted to the case 30" for rotation in response to pressurized air flow, in the same manner as described for the embodiment of FIG. 1. In the balancer 10", however, the turbine wheels 76" and 78" are mounted generally side-by-side for rotation in coaxial alignment with the shaft 14.

The case 30" includes a cylindrical case portion 304 which has the mounting base 300 at one end, and an end case portion 306 which is threadably attached to an opposite end of the cylindrical case portion. The cylindrical case portion 304 has the inner and outer balancing rings 56" and 58" positioned therein, and the end case portion 306 has the turbine wheels 76" and 78" coaxially mounted thereto. The turbine wheels are separated by a disk 110" to help block unintended cross air flows.

The gear assemblies 112" used in the balancer 10" differ from the prior embodiments of the invention in construction, but the function is generally identical. As will now be described for the inner turbine wheel 76" and the inner balancing ring 56", rotation of the inner turbine wheel 76" in response to pressurized air flow generated by a manifold (not shown) causes rotation of a tubular first gear shaft 114a" on which the inner turbine wheel is fixedly attached in the same rotational direction as the outer turbine wheel. The first gear shaft 114a" extend along the axial center of the case 30" and has a worm gear 120a" to engage a pinion gear 126a" of a second gear shaft 124a". The second gear shaft 124a" also has a worm gear 128a" which engages a pinion gear 140a" of a third gear shaft 138a". A gear 142a" of the third gear shaft 138a" engages the gear teeth 66" of the inner balancing ring 56". As with the gear assemblies used in the previously described embodiments, the gear assembly 112" just described causes the selective rotation of the inner balancing ring 56" in response to rotation of the inner turbine wheel 76" and rotates the inner balancing ring in order to reach a balanced condition. A similarly constructed and functioning gear assembly 112" is used with the outer turbine 78" and the outer balancing ring 58" and will not be described in detail (the various components of this assembly are similarly numbered using the letter "b" instead of "a"). It is noted that the first gear shaft 114b is solid and coaxially received within the tubular first gear shaft 114a" on which the inner turbine 76" is attached, and that the two first gear shafts 114a" and 114b" are independently rotatable.

Conventional bearings are used to support the various gear shafts described with respect to the case 30". Since the gears are in large part positioned within the interior space defined by the central apertures 60" of the inner and outer balancing rings 56" and 58", the case further includes a pair of interior gear mounting members 308 and 310 which are positioned within the balancing ring central apertures and held stationary with respect to the case 30" pinned in between the cylindrical case portion 304 and the end case portion 306.

It will be appreciated that, although specific embodiments of the invention have been described herein for purposes of illustration, various modifications may be made without departing from the spirit and scope of the invention. Accordingly, the invention is not limited except as by the appended claims.

I claim:

1. A balancer for dynamically balancing a machine having an elongated rotatable element power driven in at least a first rotational direction about a longitudinal rotational axis, comprising:

an annular case with first and second radially extending annular sidewalls and a central aperture extending fully through said first and second sidewalls and sized to receive the rotatable element therein with the rotatable element projecting fully through said central aperture and beyond said first and second sidewalls to permit positioning of said case at an intermediate position on the rotatable element, said case having an interior annular chamber extending about said central case aperture in substantially coaxial alignment with the rotatable element;

means for fixedly attaching said case to the rotatable element for rotational travel therewith;

a first friction engagement wheel supported by said case for rotational travel therewith, said first engagement wheel being selectively rotatable about a first engagement wheel rotational axis in first wheel first and second opposing rotational directions;

first contact members mounted to the machine in position to rotate as said first engagement wheel as said first engagement wheel passes by, said first contact members being selectively movable to frictionally contact said first engagement wheel to selectively rotate said first engagement wheel in said first wheel first or second rotational direction as said first engagement wheel travels by said first contact members carried by said rotating case;

a second friction engagement wheel supported by said case for rotational travel therewith, said second engagement wheel being selectively rotatable about a second engagement wheel rotational axis in second wheel first and second opposing rotational directions;

second contact members mounted to the machine in position to rotate said second engagement wheel as said second engagement wheel passes by, said second contact members being selectively movable to frictionally contact said second engagement wheel to selectively rotate said second engagement wheel in said second wheel first or second rotational direction as said second engagement wheel travels by said second contact members carried by said rotating case;

first and second eccentrically weighted balancing members coaxially and rotatably mounted within said case chamber for rotational travel with said case, each said balancing member having a rotational axis in substantially coaxial alignment with the rotatable element, and each said balancing member being selectively rotatable in first and second opposing rotational directions relative to the other of said balancing members and to said case, each said balancing member having an engagement portion extending at least partially about said balancing member;

first force transmission means, supported by said case for rotational travel therewith, for drivably interconnecting said first engagement wheel and said first balancing member engagement portion to convert rotation of said first engagement wheel in said first wheel first and second rotational directions into rotation of said first balancing member in said first balancing member first and second rotational directions, respectively; and second force transmission means, supported by said case for rotational travel therewith, for drivably interconnecting said second engagement wheel and said second balancing member engagement portion to convert rotation of said second engagement wheel in said second wheel first and second rotational directions into rotation of said second balancing member in said second balancing member first and second rotational directions, respectively, whereby said first and second engagement wheels are rotated in selected directions by said first and second stationary contact means when selectively operated as said first and second engagement wheels revolve with said case to progressively and independently rotate each of said first and second balancing members until the machine is dynamically balanced.

2. The balancer of claim 1 wherein said first transmission means includes first reduction gears having a sufficiently large first gear reduction ratio such that under normal operation said first balancing member exerts insufficient force on said first gears to rotate said first engagement wheel, whereby said first balancing member is locked in the rotational position to which moved by said first engagement wheel in response to said first contact members, and said second transmission means includes second reduction gears having a sufficiently large second gear reduction ratio such that under normal operation said second balancing member exerts insufficient force on said second gears to rotate said second engagement wheel, whereby said second balancing member is locked in the rotational position to which moved by said second engagement wheel in response to said second contact members.

3. The balancer of claim 2 wherein said first gear reduction ratio is such that said first reduction gears require rotation of said first engagement wheel by a first predetermined number of multiple rotations to rotate said first balancing member by one degree; and said second gear reduction ratio is such that said second reduction gears require rotation of said second engagement wheel by a second predetermined number of multiple rotations to rotate said second balancing member by one degree.

4. The balancer of claim 1 wherein said first and second contact members each includes a pair of members positioned adjacent to a corresponding one of said first or second engagement wheels and out of contact with said corresponding engagement wheel when in a neutral position, said pair of members being movable from said neutral position to frictionally contact one or the other of said members with said corresponding engagement wheel to selectively rotate said corresponding engagement wheel in said wheel first or second rotational direction.

5. The balancer of claim 4 wherein said first contact members are moved by a first pair of selectively extendable arms into a position to frictionally contact said first engagement wheel, and said second contact members are moved by a second pair of selectively extendable arms into a position to frictionally contact said second engagement wheel.

6. A balancer for dynamically balancing a machine having an elongated rotatable element power driven in at least a first rotational direction about a longitudinal rotational axis, comprising:

an annular case with first and second radially extending annular sidewalls and a central aperture extending fully through said first and second sidewalls and sized to receive the rotatable element therein with the rotatable element projecting fully through said central aperture and beyond said first and second sidewalls to permit positioning of said case at an intermediate position on the rotatable element, said case having an interior annular chamber extending about said central case aperture in substantially coaxial alignment with the rotatable element, said case having a circumferential outer wall positioned between said first and second sidewalls and extending circumferentially about the periphery of said first and second sidewalls;

means for fixedly attaching said case to the rotatable element for rotational travel therewith;

a first friction wheel assembly supported by said case for rotational travel therewith, said first wheel assembly including a first shaft with at least one first friction engagement wheel mounted thereon positioned at said circumferential outer wall to drivingly rotate said first shaft selectively about a first shaft rotational axis in first shaft first and second opposing rotational directions;

first contact members mounted to the machine at a position outward of said circumferential wall and selectively movable to frictionally contact said at least one first engagement wheel to selectively rotate said first shaft in said first shaft first or second rotational direction as said at least one first engagement wheel travels by said first contact members carried by said rotating case;

a second friction wheel assembly supported by said case for rotational travel therewith, said second wheel assembly including a second shaft with at least one second friction engagement wheel mounted thereon positioned at said circumferential outer wall to drivingly rotate said second shaft selectively about a second shaft rotational axis in second shaft first and second opposing rotational directions;

second contact members mounted to the machine at a position outward of said circumferential wall and selectively movable to frictionally contact said at least one second engagement wheel to selectively rotate said second shaft in said second shaft first or second rotational direction as said at least one second engagement wheel travels by said second contact members carried by said rotating case;

first and second eccentrically weighted balancing members coaxially and rotatably mounted within said case chamber for rotational travel with said case, each said balancing member having a rotational axis in substantially coaxial alignment with the rotatable element, and each said balancing member being selectively rotatable in first and second opposing rotational directions relative to the other of said balancing members and to said case, each said balancing member having an engagement portion extending at least partially about said balancing member;

first force transmission gears supported by said case for rotational travel therewith and drivably interconnecting said first shaft and said first balancing member engagement portion to convert rotation of said first shaft in said first shaft first and second rotational directions into rotation of said first balancing member in said first balancing member first and second rotational directions, respectively; and second force transmission gears supported by said case for rotational travel therewith and drivably interconnecting said second shaft and said second balancing member engagement portion to convert rotation of said second shaft in said second shaft first and second rotational directions into rotation of said second balancing member in said second balancing member first and second rotational directions, respectively, whereby said first and second shafts are rotated in selected directions by said first and second contact members when selectively operated as said first and second engagement wheels revolve with said case to progressively and independently rotate each of said first and second balancing members until the machine is dynamically balanced.

7. The balancer of claim 6 wherein said first transmission gears include first reduction gears having a sufficiently large first gear reduction ratio such that under normal operation said first balancing member exerts insufficient force on said first gears to rotate said first engagement wheel, whereby said first balancing member is locked in the rotational position to which moved by said first engagement wheel in response to said first contact members and said second transmission gears include second reduction gears having a sufficiently large second gear reduction ratio such that under normal operation said second balancing member exerts insufficient force on said second gears to rotate said second engagement wheel, whereby said second balancing member is locked in the rotational position to which moved by said second engagement wheel in response to said second contact members.

8. The balancer of claim 7 wherein said first gear reduction ratio is such that said first reduction gears require rotation of said first engagement wheel by a first predetermined number of multiple rotations to rotate said first balancing member by one degree; and said second gear reduction ratio is such that said second reduction gears require rotation of said second engagement wheel by a second predetermined number of multiple rotations to rotate said second balancing member by one degree.

9. The balancer of claim 6 wherein said first and second contact members each includes a pair of members positioned adjacent to a corresponding one of said first or second engagement wheels and out of contact with said corresponding engagement wheel when in a neutral position, said pair of members movable from said neutral position to frictionally contact one or the other of said members with said corresponding engagement wheel to selectively rotate said corresponding engagement wheel and hence said first or second shaft on which mounted in said shaft first or second rotational direction.

10. The balancer of claim 6 wherein said first contact members are moved by a first pair of selectively extendable arms into position to frictionally contact said at least one first engagement wheel, and said second contact members are moved by a second pair of selectively extendable arms into position to frictionally contact said at least one second engagement wheel.

11. A balancer for dynamically balancing a machine having an elongated rotatable element power driven in at least a first rotational direction about a longitudinal rotational axis, comprising:

an annular case with first and second radially extending annular sidewalls and a central aperture extending fully through said first and second sidewalls and sized to receive the rotatable element therein with the rotatable element projecting fully through said central aperture and beyond said first and second sidewalls to permit positioning of said case at an intermediate position on the rotatable element, said case having an interior annular chamber extending about said central case aperture in substantially coaxial alignment with the rotatable element;

means for fixedly attaching said case to the rotatable element for rotational travel therewith;

a first friction wheel assembly mounted to said case for rotational travel therewith, said first wheel assembly including a first shaft with at least one first friction engagement wheel mounted thereon to drivingly rotate said first shaft selectively about a first shaft rotational axis in first shaft first and second opposing rotational directions;

first contact members mounted to the machine and selectively movable to frictionally contact said at least one first engagement wheel to selectively rotate said first shaft in said first shaft first or second rotational direction as said at least one first engagement wheel travels by said first contact members carried by said rotating case;

a second friction wheel assembly mounted to said case for rotational travel therewith, said second wheel assembly including a second shaft with at least one second friction engagement wheel mounted thereon to drivingly rotate said second shaft selectively about a second shaft rotational axis in second shaft first and second opposing rotational directions;

second contact members mounted to the machine and selectively movable to frictionally contact said at least one second engagement wheel to selectively rotate said second shaft in said second shaft first or second rotational direction as said at least one second engagement wheel travels by said second contact members carried by said rotating case;

first and second eccentrically weighted balancing members coaxially and rotatably mounted within said case chamber for rotational travel with said case, each said balancing member having a rotational axis in substantially coaxial alignment with the rotatable element, and each said balancing member being selectively rotatable in first and second opposing rotational directions relative to the other of said balancing members and to said case, each said balancing member having an engagement portion extending at least partially about said balancing member;

first force transmission gears mounted to said case for rotational travel therewith and drivably interconnecting said first shaft and said first balancing member engagement portion to convert rotation of said first shaft in said first shaft first and second rotational directions into rotation of said first balancing member in said first balancing member first and second rotational directions, respectively; and second force transmission gears mounted to said case for rotational travel therewith and drivably interconnecting said second shaft and said second balancing member engagement portion to convert rotation of said second shaft in said second shaft first and second rotational directions into rotation of said second balancing member in said second balancing member first and second rotational directions, respectively, whereby said first and second shafts are rotated in selected directions by said first and second contact members when selectively operated as said first and second engagement wheels revolve with said case to progressively and independently rotate each of said first and second balancing members until the machine is dynamically balanced.

12. A balancer for dynamically balancing a machine having an elongated rotatable element power driven in at least a first rotational direction about a longitudinal rotational axis, comprising:

an annular case with first and second radially extending annular sidewalls and a central aperture extending fully through said first and second sidewalls and sized to receive the rotatable element therein with the rotatable element projecting fully through said central aperture and beyond said first and second sidewalls to permit positioning of said case at an intermediate position on the rotatable element, said case having an interior annular chamber extending about said central case aperture in substantially coaxial alignment with the rotatable element;

means for fixedly attaching said case to the rotatable element for rotational travel therewith;

a plurality of friction wheel assemblies supported by said case at a position toward a periphery of said first and second sidewalls for rotational travel with said case, said wheel assemblies each including a shaft with at least one friction engagement wheel mounted thereon to drivingly rotate said shaft selectively about a shaft rotational axis in shaft first and second opposing rotational directions;

a plurality of contact members mounted to the machine at a position radially outward of said case and selectively movable to each frictionally contact a corresponding one of said engagement wheels to selectively rotate said shaft on which said corresponding engagement wheel is mounted in said shaft first or second rotational direction as said corresponding engagement wheel travels by said contact member carried by said rotating case;

first and second eccentrically weighted balancing members coaxially and rotatably mounted within said case chamber for rotational travel with said case, each said balancing member having a rotational axis in substantially coaxial alignment with the rotatable element, and each said balancing member being selectively rotatable in first and second opposing rotational directions relative to the other of said balancing members and to said case, each said balancing member having an engagement portion extending at least partially about said balancing member; and force transmission gears supported by said case for rotational travel therewith and drivably interconnecting said engagement wheel shafts and said balancing member engagement portions to convert rotation of said shafts in said shaft first and second rotational directions into rotation of said first and second balancing members in said balancing member first and second rotational directions, whereby said shafts are rotated in selected directions by said contact members when selectively operated as said engagement wheels revolve with said case to progressively and independently rotate each of said first and second balancing members until the machine is dynamically balanced.

* * * * *